E. SULLIVAN.
REAMER.
No. 79,276.  Patented June 23, 1868.
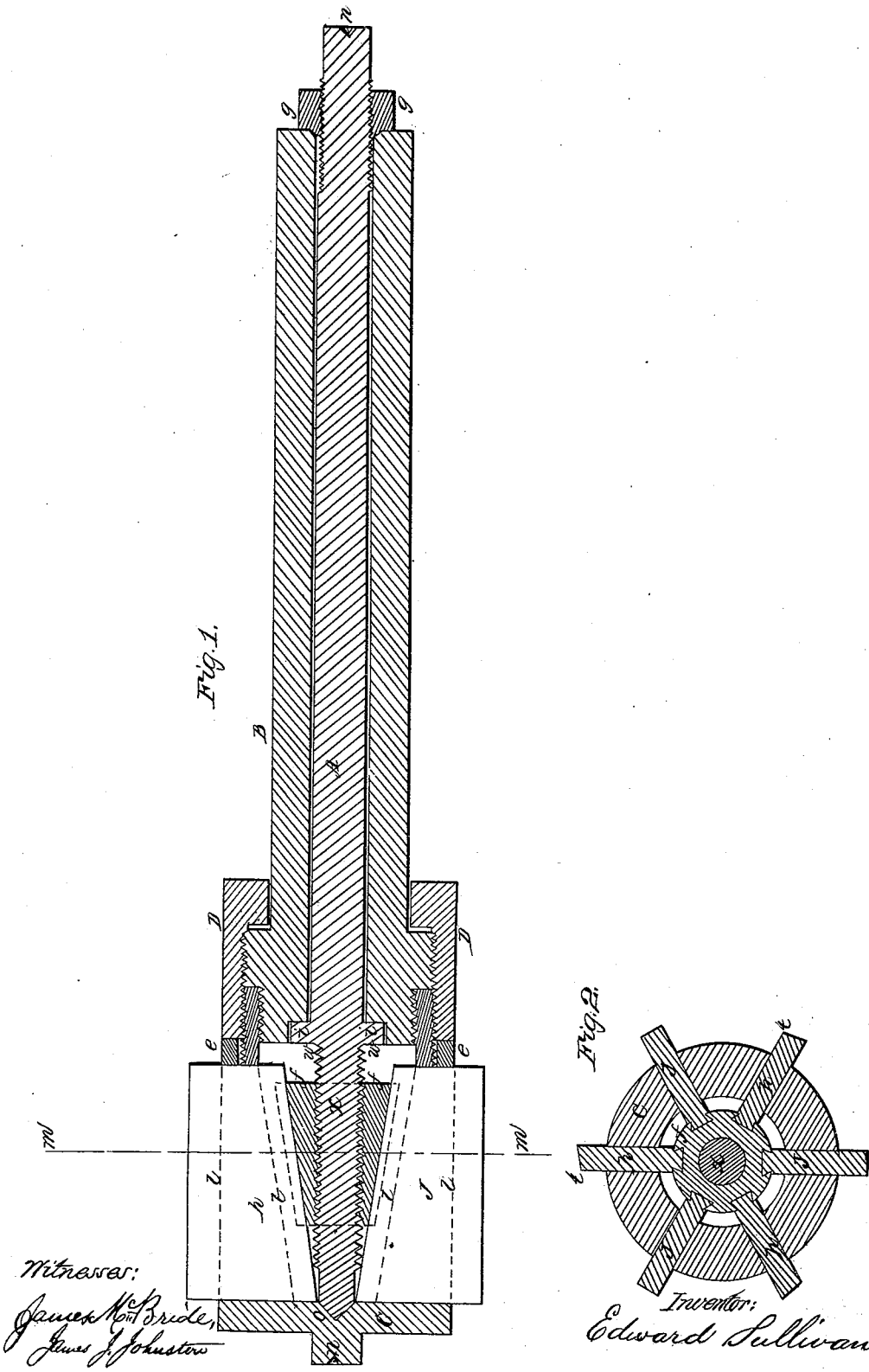

United States Patent Office.

EDWARD SULLIVAN, OF PITTSBURG, PENNSYLVANIA.

Letters Patent No. 79,276, dated June 23, 1868; antedated June 6, 1868.

---

IMPROVEMENT IN REAMERS.

---

The Schedule referred to in these Letters Patent and making part of the same.

---

TO ALL WHOM IT MAY CONCERN:

Be it known that I, EDWARD SULLIVAN, of Pittsburg, in the county of Allegheny, and State of Pennsylvania, have invented a new and useful Improvement in "Graduating-Reamers;" and I do hereby declare the following to be a full and exact description thereof, reference being had to the accompanying drawings, and to the letters of reference marked thereon.

The nature of my invention consists in the combination and arrangement of a number of parts, the whole making a reamer, the cutters of which can be graduated so as to bore holes of different diameters, and operating in the manner hereinafter described.

To enable others skilled in the art to make and use my invention, I will proceed to describe its construction and operation.

In the accompanying drawings, making part of this specification—

Figure 1 is a longitudinal section of my improved reamers.

Figure 2 is a transverse section of the same, cut through line $m$, fig. 1.

In fig. 1, B represents a hollow shank, upon one end of which are formed two screw-threads, one of which is to receive the cutter-head C, and the other to receive the sleeve D. $h$ are the cutters, and J are the wooden blanks. A is a rod or stem placed within the shank B, and furnished at one end with the screw-thread $x$, to receive the cone $f$, and at the other end with a square head to receive a wrench, and with the screw-thread and nut $g$. $f$ is a conical-shaped piece, for the purpose of holding the cutters and blanks. C is the cutter-head, through which the cutters and blanks project. $e$ is a collar, and D is a sleeve for the purpose of holding the collar $e$ up against the ends of the cutters and blanks.

The manner in which I construct my reamer is as follows:

I make the shank B of cast iron, and either core or bore the hole through it to receive the rod A. Upon one end of the shank B are formed the screw-threads to receive the cutter-head C and sleeve D. The cutter-head I also make of cast iron, hollow, as shown by the dotted lines $l$, and with slots or mortises, which extend out through one end of the head to receive the cutters $h$ and blanks J. Upon the open end of the cutter-head C, I form two screw-threads, one male and one female; the female to receive the end of the shank B, and the male to meet the male screw-thread on the shank B; and to receive the sleeve D, the collar $e$ is made large enough inside to pass over the outside of the above-mentioned male-screw threads, intended to receive the sleeve D, which is made of cast iron, the collar $e$ of wrought iron. The rod A and nut $g$, I make of wrought iron or steel, and terminate one end of the rod in a conical shape, which fits into the recess in the cutter-head C, as shown at the point marked $o$, for the purpose of keeping the rod in the centre of the reamer, and steadying the cutters. Upon the rod, at the point marked $w$, I form a collar, $i$, which fits into a recess in the end of the shank B, the use of said collar, when used in connection with the nut $g$, being to fasten the rod A when the cutters are set to the required position. The cone $f$, I make of wrought iron or steel, and on the inside of the hole, which passes through the centre of it, I form the screw-thread to receive the screw-thread $x$ on the rod A, and upon its outside surface I form the dove-tail grooves to receive the cutters and blanks, which are fitted neatly into it, but with sufficient play to allow the cone to be moved back and forth by the rod A, for the purpose of regulating the cutters and blanks. The cutters I make of steel, and the blanks of hard wood, such as hickory or locust, and after fitting them into the cone and cutter-head, and putting all parts of the reamer together, I put the reamer into the turning-lathe, upon the centres marked $n$, and dress them off true. I now file off the back of the cutters, as shown at the points marked $t$, so as to give them a cutting-edge. The blanks I leave as they come from the lathe, their purpose being to steady the reamer in the work.

The reamer is now finished and ready for operation, which is as follows:

Having the diameter given to which it is required to bore a hole, I unscrew the nut $g$ upon the rod A and the sleeve D upon the shank B, and placing a wrench on the end of the rod, I turn said rod in the proper direction, and move the cone $f$, which moves the cutters $h$ and blanks J to the required size. I now tighten the nut

*g* upon the rod A, which draws the collars *i* up against the end of the shank B, and thereby prevent the rod A from becoming disarranged and moving the cutters and blanks. I now tighten up the sleeve D against the collar *e*, which comes against the cutters and blanks, which comes against the cutter-head C, and by this means bind the cutters and blanks firmly in their place.

The reamer is now ready for use, and is applied to the work in the same manner as the ordinary reamer and "rose-bit," the application of which is well known to the skillful workman, and therefore not necessary to be described.

I wish it understood I do not confine myself to any particular size or proportion, or the kind of material used in the construction of my improved reamer, for the same may be varied to suit the judgment of the mechanic making and using it, and the same general result obtained.

Having thus described the nature, construction, and operation of my improvement, what I claim as of my invention, is—

The combination and arrangement of the cutters and blank-head C, collar *e*, sleeve D, cone *f*, rod A, and the cutters and blanks, the whole being constructed, arranged, combined, and operating substantially as herein described, and for the purpose set forth.

EDWARD SULLIVAN.

Witnesses:
JAMES J. JOHNSTON,
JAMES McBRIDE.